June 14, 1966   J. V. FISHER   3,256,044
WHEEL OPENING PLUG
Filed June 15, 1964   2 Sheets-Sheet 1
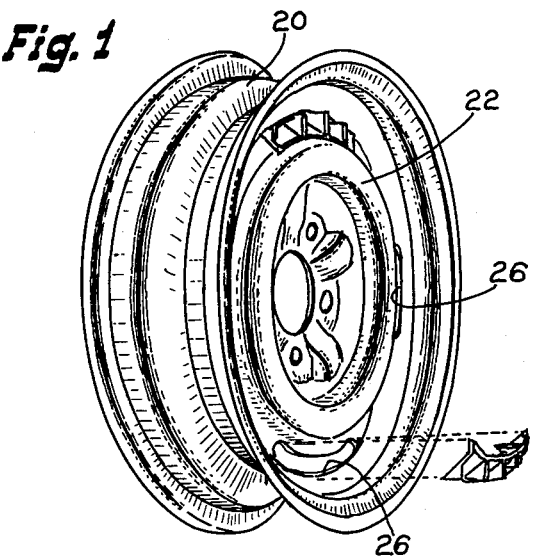
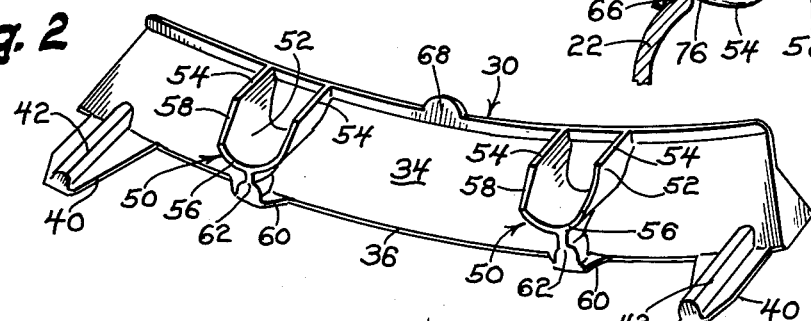
INVENTOR.
Julian V. Fisher
BY
His Att'y June 14, 1966  J. V. FISHER  3,256,044
WHEEL OPENING PLUG
Filed June 15, 1964  2 Sheets-Sheet 2
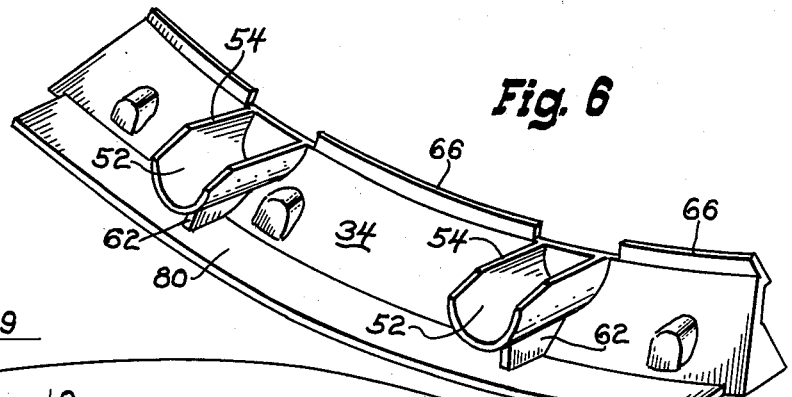
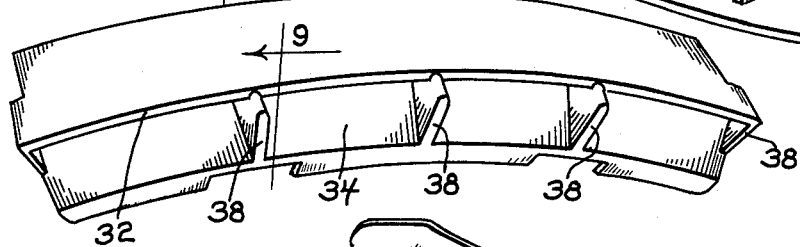
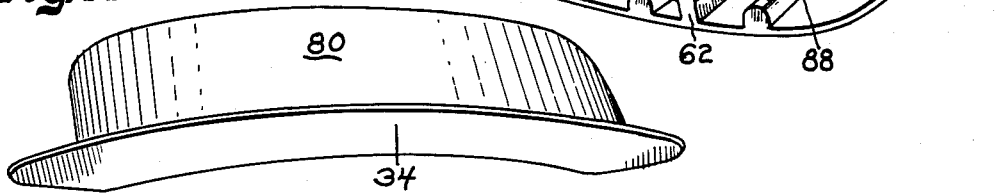
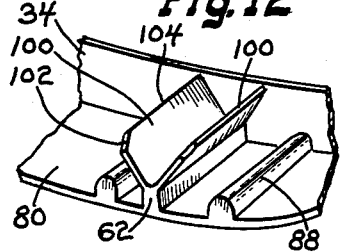
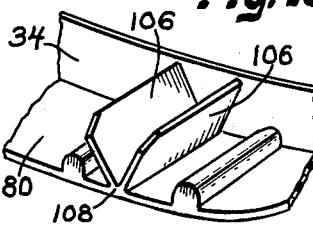
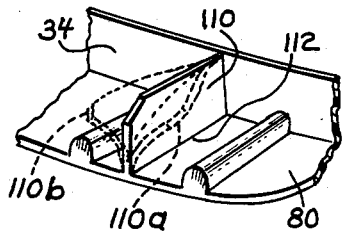
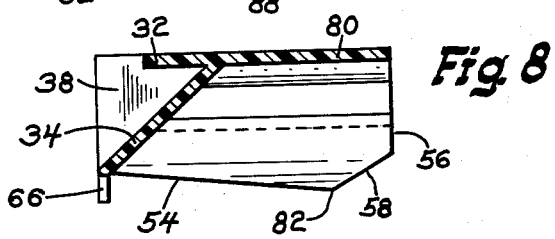
INVENTOR.
Julian V. Fisher
BY
His Att'y United States Patent Office 3,256,044
Patented June 14, 1966

3,256,044
WHEEL OPENING PLUG
Julian V. Fisher, Carpentersville, Ill., assignor to Illinois Tool Works Inc., Chicago, Ill., a corporation of Delaware
Filed June 15, 1964, Ser. No. 375,272
12 Claims. (Cl. 301—63)

The present invention relates to a clip or plug adapted to be secured to a wheel, and more particularly, to a device adapted to close openings in a standard disc-type wheel for automobiles and the like.

Standard disc-type wheels for automobiles generally include an annular rim and a central disc welded or riveted to the rim. It is the general practice to provide slots or openings spaced about the peripheral edge of the disc, which openings are useful for mounting skid chains and the like on the wheel in a well known manner. It has been found that these openings often become clogged with dirt or other foreign material, and in cases where a large diameter wheel cover is utilized in place of a standard hub cap, it has been found that rocks often pass through the opening into the cavity between the wheel cover and the wheel disc. Such rocks trapped within the wheel cover often damage the cover or wheel disc and, in addition, cause an annoying rattling when the vehicle is in motion. An object of the present invention is to eliminate the above mentioned difficulties by providing a novel clip or plug which is adapted to be quickly and easily mounted on the wheel to close the openings in the wheel disc.

A more specific object of the present invention is to provide a device for the above described purpose, which device may be economically manufactured from plastic materials, such as polypropylene, as by injection molding.

Still another object of the present invention is to provide a novel device of the above described type with simple, yet highly effective, means for securely mounting the clip on the wheel.

A further object of the present invention is to provide a simple design for a device of the type contemplated which will permit the use of economical two-plate dies in the fabrication of the device. Other objects and advantages will be apparent from the following description and the accompanying drawing wherein:

FIG. 1 is a perspective view of a disc-type wheel showing the present invention applied thereto;

FIG. 2 is a perspective view showing a wheel clip or plug embodying the principles of this invention;

FIG. 3 is a perspective view of the device shown in FIG. 2 when viewed in inverted position from the opposite side;

FIG. 4 is a vertical cross section taken along line 4—4 in FIG. 3;

FIG. 5 is a fragmentary cross sectional view showing the novel clip of this invention in mounted position to close an opening in a standard disc-type wheel;

FIG. 6 is a perspective view of a slightly modified clip embodying the principles of this invention;

FIG. 7 is a perspective view of the clip shown in FIG. 6 when viewed from the reverse side in inverted position;

FIG. 8 is a vertical cross section taken along line 8—8 of FIG. 7 wherein the attachment means is a slightly different design;

FIG. 9 is a fragmentary vertical cross sectional view showing the device of FIG. 8 is applied position;

FIG. 10 is a further modification to a clip embodying the principles of the invention;

FIG. 11 is a perspective view of the clip shown in FIG. 10 when viewed from the reverse side and in inverted position;

FIG. 12 is a modification to the attaching portion for a clip of the type contemplated by the invention;

FIG. 13 is a further modification to the attaching portion of a clip contemplated by the present invention; and FIG. 14 is still another modification to the attaching portion for a clip contemplated by the present invention.

Referring now more specifically to the drawing, wherein like parts are designated by the same numeral throughout the various figures, a standard disc-type wheel to which the clips of the present invention are applied, include a wheel rim 20 having a centrally arranged wheel disc 22 mounted thereon as by either riveting or welding to the central substantially flat section 24 of the wheel rim. Openings 26 are provided at spaced intervals about the periphery of the disc 22 through which attaching means for skid chains and the like may pass. These openings may be formed either by total interruption of a flange which attaches the disc to the flat portion 24, as shown in FIG. 5 or alternatively, may merely be a radial deformation of the flange 28 used for attaching the disc to the rim, as shown in FIG. 9.

An embodiment of a wheel clip or plug 30 embodying the principles of this invention is shown best in FIGS. 2–5. The plug 30 includes a body member having body sections 32 and 34 integrally joined along line 36. It should be noted that the body section 32 and the junction line 36 are curved to conform with the curvature of a wheel rim, as more fully described heerinbelow. In the present embodiment, the body sections 32 and 34 are angularly disposed relative to one another to form a substantially V-shaped cross section. The two body sections are maintained in spaced relation in this embodiment by a plurality of ribs 38 spaced along the body section and disposed axially relative to the V. Coplanar with the body section 32 and extending axially outwardly from the line of juncture 36, are locating or stabilizing means 40. In the present embodiment, the locating means 40 are a pair of flat leg-like elements reinforced on their upper surface by axially extending rib means 42. Axially extending attachment means 50 are provided on the outer surface of body section 34. The attachment means 50 in the present embodiment include a thin trough-like portion 52 which is semi-cylindrical in configuration and integral at one end with body section 34. The trough-like member 52 is open at the opposite end and is provided with a pair of free upper edges 54 which are resiliently deformable for purposes best set forth hereinafter. The outer end 56 of the attachment portion is relieved at its juncture with the upper edges 54 to provide a cam surface 58 to facilitate entry of the clip or plug into the wheel opening 26. A projection 60, coplanar with body section 32 extends outwardly in the same direction as stabilizing means 40 and carries on top of it a reinforcing and supporting rib structure 62 which provides basal support to the attaching means.

A flange 66 is provided along the free edge of body section 34 and extends laterally away from the opposite body section 32. Intermediate the extremities of flange 66 an additional protuberance or a thumb gripping means 68 is provided for purposes best set forth hereinafter.

In the application of a clip of this configuration, body section 32 with its coplanar stabilizing means 40 are engaged with the flat portion 24 of the rim 20 while the entire clip or plug is telescoped axially through the elongated opening 26. As the edge 70 of the disc 22 engages the attaching means, it is first confronted by the cam surfaces 58 which tend to distort the web-like cross section of the trough member 52. When the free edge 54 is distorted, it will, because of its resilient nature, return substantially to its initial position after it has passed behind the inner surface of wheel disc 22 and hence, forms a retaining shoulder designated as 76 which will retain the plug in mounted position when fully telescoped within the hole to a position where flange 66 bears on the outer surface of disc 22. It is apparent that the plug which is designed to have substantially the same transverse extent as the opening 26 will effectively seal the opening 26 since there are no apertures or voids in the basic clip 30. The extensions 60 and stabilizing means 40 provide a firm seat against the flat portion 24 of the rim to give a substantially rigid back up to the deformation of the attaching portion 50.

As was previously discussed, the wheel disc 22 normally is attached to the flat portion 24 of the rim 20 by means of a laterally extending flange. As was also explained, the flange can either be discontinuous or continuous and radially deformed to provide an opening.

To accommodate the situation where the flange 28 is merely radially deformed rather than being eliminated to form the opening 26, as best seen in FIG. 9, it has been necessary to modify the embodiment previously disclosed. Referring now to FIGS. 6–9, the plug 30 includes body sections 32 and 34, reinforcing ribs 38 and flange 66 extending laterally from the free edge of body section 34. Because of the greater measurements involved in this application, it is necessary to extend the attaching means and the free edges 54 a greater axial extent to accommodate the flange 28. The stabilizing means 40 and extension 60 in the first embodiment have been replaced by a continuous substantially constant width of flange element 80 adapted to serve to locate the fastener within the wheel opening during insertion and further, to stabilize and support the attachment means through the use of the rib structure 62. It has been found desirable in an attaching means having a very substantial axial extent to provide a reverse taper on the free edge 54 from its point of juncture 82 with the cam surface 58. This forms a semipositive form of retaining shoulder to assist in the retention of the plug relative to the opening. When this particular embodiment is telescoped into the opening, the trough 52 is deformed by the flange 28 until the flange 66 has seated against the outer surface of disc 22. At this time, the inherent resiliency of the material permits the free edge 54 to spring back to a substantially initial position behind the terminal edge of flange 28 and to form a shoulder as designated at point 76 which serves to retain the plug in mounted position.

A further embodiment of the present invention may be seen in FIGS. 10 and 11. In this embodiment, the V-shaped cross sectional configuration of the body portion has been eliminated to leave body section 34 disposed substantially at right angles to the flange 80 and with the trough-shaped portions 52 of the attachment means 50 abutting at right angles into the body section 34, while flange 80 can be suitably reinforced by axially extending ribs 88 which are disposed on opposite sides of rib structure 62 to provide rigidity to the attachment means 50. A device of the type shown in this modified form of the invention is ideally adapted to those situations wherein the disc 22 is substantially perpendicular to the flat portion 24 of the rim so as to permit the vertically disposed body section 34 to seat against the rim and disc simultaneously. The deformation of the attachment means in the formation of a shoulder for retaining the clip in position is ostensibly the same as in the previous embodiments.

Three modifications to the attachment means are shown in FIGS. 12–14. In FIG. 12 the attachment portion 50 includes a supporting rib structure 62 extending laterally away from flange 80, said flange 80 being laterally supported for rigidity purposes by ribs 88. Extending from rib 62 and spaced from flange 80 in a substantially V-shape configuration are thin web-like members 100 which are attached at one end to the body section 34 and provided at the opposite extremity with cam surfaces 102 to facilitate entry into the wheel opening. The deformation of the free edges 104 and the resultant formation of the shoulder means disposed behind the edge of the disc opening is substantially the same as the previously disclosed embodiments.

Referring to FIG. 13, a modification to the attachment means discloses web-like members 106 disposed in a V-shape configuration with the apex of the V 108 integral with the flange 80 and attached to the body section 34 at one end. The deformation and result in the formation of the shoulder means in this embodiment is again substantially identical to that previously disclosed.

The last modification to the present invention is shown in FIG. 14 wherein a single web-like means 110 is attached along its one axial edge 112 to the flange 80 and at one extremity, is integral with the body section 34. The web 110 may be deflected either to the right or to the left as shown in phantom, and designated as 110A and 110B respectively. The deformation and subsequent resilient return to substantially the initial position to form shoulder means is operationally substantially the same as the previous embodiments disclosed.

It will be apparent from the above disclosure that the embodiments of the present invention provide a simple economical means for closing the elongated openings found in the discs of the modern wheels used in automobiles. The stabilizing means or locating means which are found in the various embodiments and designated as 40 and 80 respectively, provide a broad base or reactive surface against which the forces developed by the deformation of the attachment means can be transmitted to the rim. The use of a plastic material which is resilient in nature, permits this clip to be utilized in disc-type wheels having a wide variance in tolerances in the openings provided about the periphery of the disc. While applicant has suggested the use of polypropylene as a suitable material, it will be apparent that other thermoplastic materials capable of being injection molded would be equally acceptable, for example the material commonly known as nylon.

While the preferred embodiments of the present invention have been shown and described herein, it is obvious that many changes may be made in the structural details of the invention without departing from the spirit and scope of the appended claims.

I claim:

1. A clip adapted to be used for closing elongated curved openings in a disc-type wheel, which clip includes an elongated thermoplastic one piece body member having a base and a divergent flange to form an acute angular V-shaped cross section with the open end of the V-shape facing axially outwardly with respect to the wheel with which it may be associated, locating means extending inwardly from the closed end of the V and in coplanar relationship with the base, attachment means extending inwardly from the closed end of the V and integral with the angularly disposed flange portion and extending radially in a direction opposite to the locating means, said attachment means being at least two in number and spaced along the elongated body member, each of said attachment means presenting at least one web-like edge facing in a direction away from said locating means and capable of being resiliently deformed transversely of the edge and adapted to return substantially to its initial position to form shoulder means adapted to engage the opposite surface of the wheel with which it may be associated when the clip is introduced into the wheel opening with the attachment means adapted to engage one elongated edge of the opening while the locating means is adapted to engage the opposite elongated edge of the opening.

2. A device of the type claimed in claim 1 wherein each of said attachment means is generally semi-cylindrical in cross-sectional configuration and presents two deformable edges adapted for engagement with the edge of the wheel opening, said locating means being a pair of reinforced finger means coplanar with the base of said V-shaped body member and spaced laterally from said attachment means.

3. A one-piece plastic clip adapted to close an elongated opening in a complementary disk type wheel comprising a body member which is elongated and substantially V-shaped in cross section, a plurality of rib means provided on the interior of said V and spaced along the elongated body to rigidify and reinforce said body member, a plurality of attachment portions integral with said body member which extend laterally from a surface of the body opposite the reinforcing ribs and are inwardly spaced from the extremities of said body member, said attachment portions each being a flexible web-like member of concave configuration with each initially presenting at least one substantially linear free edge which is oriented in spaced and substantially parallel opposed relation to one of the surfaces of said V-shaped body member and adapted to be deformed by one edge of said opening in the body of said complementary wheel when said clip is telescopically associated with the opening therein, said web-like members adapted to return substantially to their initial position on the opposite side of said opening whereby to form shoulder means which in their deformed state engage the undersurface of the margin surrounding the opening in the complementary wheel to retain said clip in mounted position on the wheel.

4. A device of the type claimed in claim 3 wherein said body has a curvilinear portion of substantially the same extent as the elongated opening in a wheel with which it is to be associated and a flange portion extending substantially normal at all points of tangency to said curvilinear portion adapted to cover said wheel opening, said curvilinear portion adapted to engage one elongated edge of said wheel opening and said attachment portions adapted to engage the opposite edge of said wheel opening in opposition to said curvilinear portion.

5. A device of the type claimed in claim 3 wherein said attachment portions are each a pair of planar members disposed in diverging relationship to provide a pair of free deformable edge surfaces adapted to engage an edge of the wheel opening.

6. A device of the type claimed in claim 3 wherein said flexible web-like attachment portions each are generally semi-cylindrical in configuration and each presents a pair of deformable free edge surfaces adapted to deformably engage the undersurface of the margin surrounding the opening in the complementary wheel.

7. A device of the type claimed in claim 6 wherein the side of the V body opposite the side supporting the attachment portions is provided with means extending axially in the same direction as said attachment portions to provide lateral stability to the clip during insertion.

8. A device of the type claimed in claim 7 wherein the attachment portions extend from one side of the V-shaped body portion and a substantially continuous flange is provided as an extension of the opposite side of the V-shaped body portion in a direction away from the closed side of the V so as to provide lateral stability to the clip in opposition to the attachment portions.

9. A device of the type claimed in claim 8 wherein said attachment portions are each substantially semi-cylindrical in shape providing in combination four deformable edges adapted to engage with the side of the wheel opening, said edges being in spaced relation along the longitudinal measurement of the clip, the opposite side of said attachment portions being maintained in spaced relation to said curvilinear portion by ribs extending outwardly from said curvilinear portion.

10. A device of the type claimed in claim 6 wherein said attachment portions each diverge outwardly from said point of attachment to said body member and thence inwardly to provide a cam surface for facilitating entrance of the device in the wheel opening and a positive shoulder in addition to the deformability of the web sections to assist in the retention of the device in the body member.

11. A one-piece clip for closing openings in a disc-type wheel comprising an elongated body member of thermoplastic material having integral body sections each of which are joined along one of their longitudinal edges to the other to provide an angular body portion in cross section and one of said body sections extending from said joined edge being arcuate shaped and complementary to the margin of the opening in the complementary wheel member, a pair of attachment portions generally located inwardly from the outer ends of the body member and extending radially from the concave side of said arcuately shaped body section in the same direction as said other body section, each of said attaching portions being concaved in cross section and presenting at least one resilient initially substantially straight web-like edge surface capable of being deformed to form shoulder means in spaced and substantially parallel opposed relation to said other body section, said arcuate body section being adapted for insertion into the opening in the wheel and adapted to engage one margin of the wheel opening while said attachment portions are adapted to be deformed to form shoulders in engagement with the opposite margin of said wheel opening, said second body section having a greater longitudinal extent than either the arcuately disposed body section or the elongated hole with which it is to be associated and being adapted to substantially totally cover said wheel opening.

12. A device of the type claimed in claim 11 wherein each of said attachment portions are generally semi-cylindrical in cross section and presenting a trough portion opening laterally away from said body section and supported on its lower rounded surface by an axially extending flange along its length, said trough presenting a pair of deformable edge surfaces adapted to form shoulder means for retention of the clip, the exposed edges of said trough being axially relieved adjacent their free extremity to provide cam surfaces for facilitating insertion in the wheel opening while the opposite end of the trough is integral with and supported by said angularly disposed body section.

References Cited by the Examiner

UNITED STATES PATENTS

| | | | |
|---|---|---|---|
| 2,368,235 | 1/1945 | Lyon | 301—37 |
| 2,698,204 | 12/1954 | Poupitch | 301—63 |
| 2,774,633 | 12/1956 | Lyon | 301—37 |
| 3,111,347 | 11/1963 | Miller | 220—60 X |

BENJAMIN HERSH, *Primary Examiner.*

A. HARRY LEVY, *Examiner.*

R. J. JOHNSON, *Assistant Examiner.*